(12) United States Patent
Bao et al.

(10) Patent No.: US 12,225,619 B2
(45) Date of Patent: Feb. 11, 2025

(54) SIDELINK DTX METHOD AND APPARATUS, SIDELINK DRX METHOD AND APPARATUS, AND TERMINAL DEVICE

(71) Applicant: VIVO MOBILE COMMUNICATION CO., LTD., Guangdong (CN)

(72) Inventors: Wei Bao, Guangdong (CN); Xiaodong Yang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 370 days.

(21) Appl. No.: 17/676,532

(22) Filed: Feb. 21, 2022

(65) Prior Publication Data

US 2022/0183103 A1 Jun. 9, 2022

Related U.S. Application Data

(63) Continuation of application No. PCT/CN2020/108456, filed on Aug. 11, 2020.

(30) Foreign Application Priority Data

Aug. 22, 2019 (CN) .......................... 201910780085.2

(51) Int. Cl.
  *H04W 76/28* (2018.01)
  *H04W 72/12* (2023.01)
  *H04W 92/18* (2009.01)

(52) U.S. Cl.
  CPC ........... *H04W 76/28* (2018.02); *H04W 72/12* (2013.01); *H04W 92/18* (2013.01)

(58) Field of Classification Search
  CPC .............................. H04W 76/28; H04W 72/12
  See application file for complete search history.

(56) References Cited

U.S. PATENT DOCUMENTS 11,438,842 B2 * 9/2022 Zhao ..................... H04W 76/10
2017/0202054 A1 7/2017 Rathonyi et al.
(Continued)

FOREIGN PATENT DOCUMENTS

CN 111345103 A 6/2020
EP 3500028 A1 6/2019
(Continued)

OTHER PUBLICATIONS

Extended European Search Report for European Application No. 20854280.3-1215, dated Sep. 19, 2022, 11 Pages.
ZTE, "Discussion on PC5 DRX," 3GPP Tsg-Ran WG2 #98, Agenda item 9.1.3, May 15-19, 2017, R1-1704634, Hangzhou, China, 4 Pages.
(Continued)

*Primary Examiner* — Kevin C. Harper
(74) *Attorney, Agent, or Firm* — BROOKS KUSHMAN P.C.

(57) ABSTRACT

A sidelink discontinuous transmission (DTX) method and apparatus, a sidelink discontinuous reception (DRX) method and apparatus, and a terminal device, and relates to the field of communication technologies. The sidelink DTX method and apparatus, the sidelink DRX method and apparatus, and the terminal device are utilized, so that when user terminals communicate with each other through a sidelink, data scheduling/transmission is monitored, or data scheduling/transmission is received, or it is allowed to perform data scheduling/transmission to a first user terminal, or data scheduling/transmission to the first user terminal is performed under control of a timer based on a DRX mechanism only during running of a target receive timer in the timer.

12 Claims, 9 Drawing Sheets

(56) References Cited

U.S. PATENT DOCUMENTS

| | | | |
|---|---|---|---|
| 2019/0053305 A1 | 2/2019 | Saiwai et al. | |
| 2019/0116626 A1* | 4/2019 | Zhao | H04W 76/14 |
| 2019/0158229 A1 | 5/2019 | Wei et al. | |
| 2019/0208535 A1* | 7/2019 | Bergström | H04W 72/0446 |
| 2019/0373647 A1 | 12/2019 | Rugeland et al. | |
| 2020/0029299 A1 | 1/2020 | Kuang et al. | |
| 2020/0351067 A1* | 11/2020 | Hui | H04L 5/001 |
| 2022/0104035 A1* | 3/2022 | Tenny | H04W 4/50 |
| 2022/0312241 A1* | 9/2022 | Xu | H04L 1/1883 |

FOREIGN PATENT DOCUMENTS

| | | |
|---|---|---|
| WO | 2018016882 A1 | 1/2018 |
| WO | 2018027821 A1 | 2/2018 |
| WO | 2018170913 A1 | 9/2018 |
| WO | 2021233392 A1 | 11/2021 |

OTHER PUBLICATIONS

First Office Action for Chinese Application No. 201910780085.2, dated Nov. 29, 2021, 11 Pages.

International Search Report and Written Opinion for Application No. PCT/CN2020/108456, dated Nov. 20, 2020, 5 Pages.

Intel Corporation, ITL, "DRX in Sidelink," 3GPP TSG RAN WG2 Meeting #96, Nov. 14-18, 2016, Agenda Item 8.4.3.2, R2-167764, Reno, NV, USA, 2 Pages.

ZTE, "Discussion on PC5 Connection Establishment and Maintenance, " 3GPP TSG-RAN WG2 Meeting #97, Feb. 13-17, 2017, Agenda Item 9.1.2.2, R2-1700794, Athens, Greece, 5 Pages.

Intel Corporation, ITL, "DRX in Sidelink," 3GPP TSG RAN WG2 Meeting #97, Nov. 13-17, 2017, Agenda Item 9.1.3.2, R2-1701309, Athens, Greece, 2 Pages.

Rohde & Schwarz, "ProSe: Reference Sensitivity Test," 3GPP TSG-RAN WG5 Meeting #69, Nov. 16-20, 2015, R5-155310, Anaheim, CA, USA, 9 Pages.

* cited by examiner

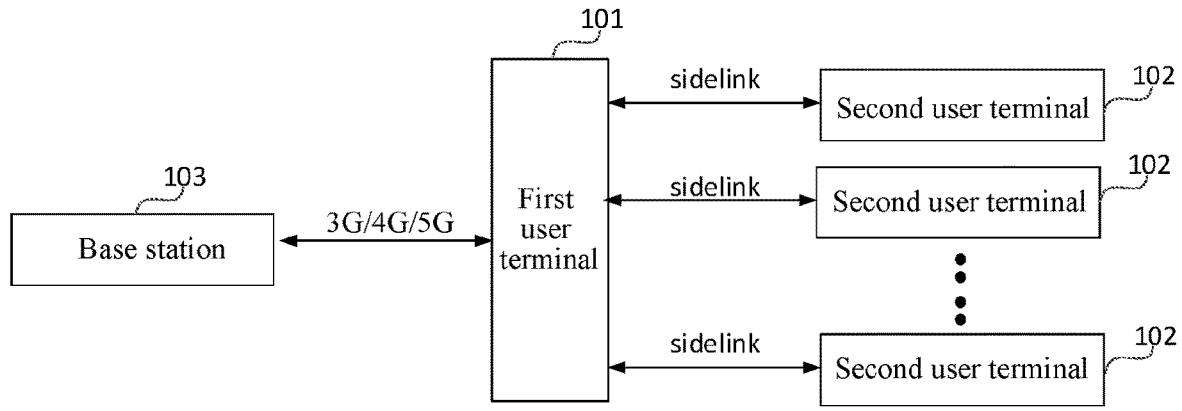
FIG. 1
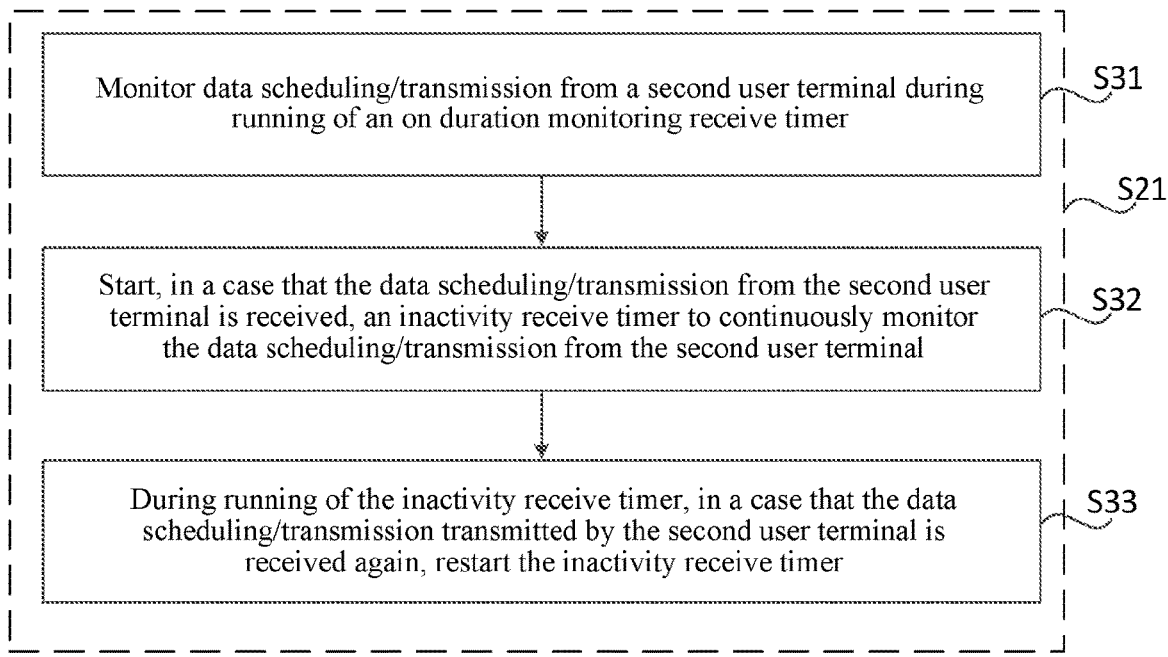
FIG. 2
FIG. 3

Allow performing data scheduling/transmission to a first user terminal, or perform data scheduling/transmission to the first user terminal under control of a timer based on a DRX mechanism during running of a target transmit timer in the timer ~S121
FIG. 12
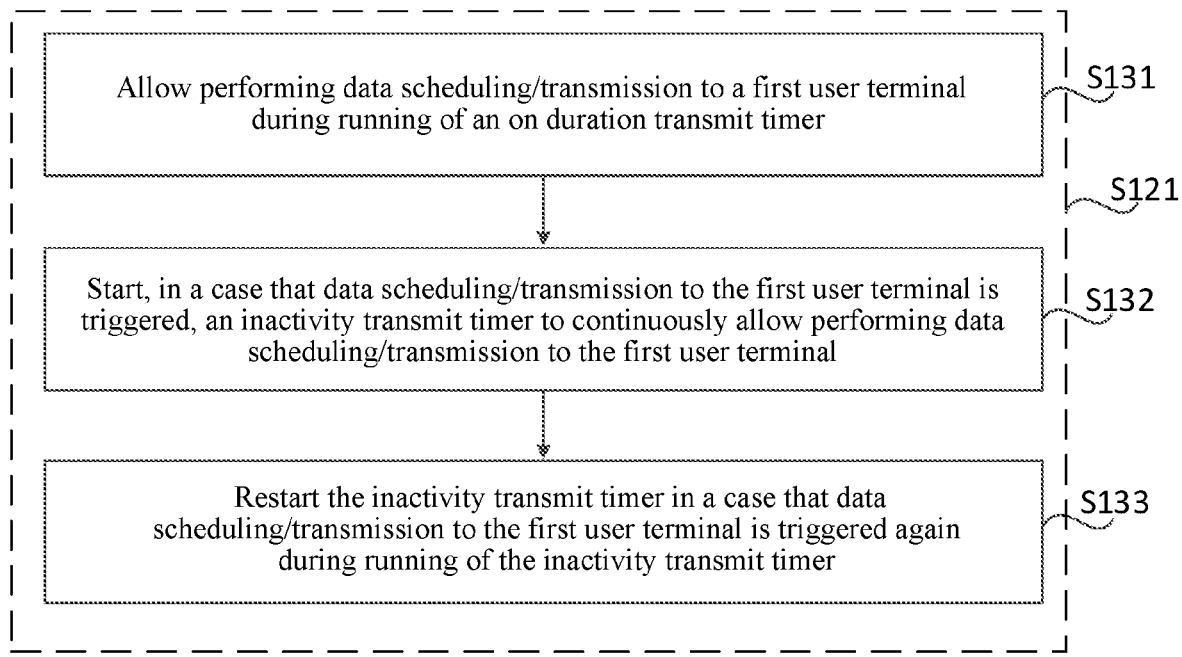
FIG. 13
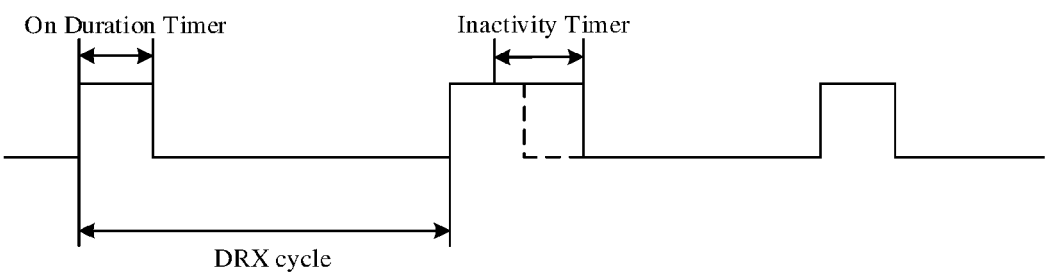
FIG. 14

SIDELINK DTX METHOD AND APPARATUS, SIDELINK DRX METHOD AND APPARATUS, AND TERMINAL DEVICE

CROSS-REFERENCE TO RELATED APPLICATIONS

This application is a continuation application of International Application No. PCT/CN2020/108456 filed on Aug. 11, 2020, which claims priority to Chinese Patent Application No. 201910780085.2 filed on Aug. 22, 2019, which are incorporated herein by reference in their entireties.

TECHNICAL FIELD

The present disclosure relates to the field of communication technologies, and in particular, to a sidelink discontinuous transmission (DTX) method and apparatus, a sidelink discontinuous reception (DRX) method and apparatus, and a terminal device.

BACKGROUND

Existing long term evolution (LTE) systems support sidelink (sidelink) communications, allowing direct data exchange between user terminals (UE) without going through a base station.

In existing solutions, when a user terminal communicates with a base station, only the user terminal is configured with a power saving mechanism. For communication between user terminals using a sidelink interface, both sides of the communication have power saving requirements. However, the existing power saving mechanisms are designed for Uu interfaces of user terminals for communication with base stations, and cannot be applied to the sidelink interface. Therefore, currently, when the user terminals communicate with each other through a sidelink, the power saving requirements of the user terminals cannot be satisfied.

SUMMARY

According to a first aspect, the present disclosure provides a sidelink DRX method, applicable to a first user terminal, the method including:

monitoring data scheduling/transmission or receiving data scheduling/transmission under control of a timer based on a DRX mechanism during running of a target receive timer in the timer.

According to a second aspect, the present disclosure further provides a sidelink discontinuous reception (DRX) apparatus, applicable to a first user terminal, the apparatus including:

an information receiving unit, configured to monitor data scheduling/transmission or receive data scheduling/transmission under control of a timer based on a DRX mechanism during running of a target receive timer in the timer.

According to a third aspect, the present disclosure further provides a terminal device, including a processor, a memory, and a computer program stored on the memory and executable on the processor, where the computer program is executed by the processor to implement the steps of the sidelink DRX method according to the first aspect of the present disclosure.

According to a fourth aspect, the present disclosure provides a sidelink DTX method, applicable to a second user terminal, the method including:

allowing performing data scheduling/transmission to a first user terminal, or performing data scheduling/transmission to the first user terminal under control of a timer based on a DRX mechanism during running of a target transmit timer in the timer.

According to a fifth aspect, the present disclosure provides a sidelink DTX apparatus, applicable to a second user terminal, the apparatus including:

an information sending unit, configured to allow performing data scheduling/transmission to a first user terminal, or performing data scheduling/transmission to the first user terminal under control of a timer based on a DRX mechanism during running of a target transmit timer in the timer.

According to a sixth aspect, the present disclosure further provides a terminal device, including a processor, a memory, and a computer program stored on the memory and executable on the processor, where the computer program is executed by the processor to implement the steps of the sidelink DTX method according to the first aspect of the present disclosure.

BRIEF DESCRIPTION OF THE DRAWINGS

The accompanying drawings described herein are used to provide further understanding of the present disclosure and construct a part of the present disclosure. Exemplary embodiments of the present disclosure and descriptions thereof are used to explain the present disclosure, and do not constitute an improper limitation to the present disclosure. In the accompanying drawings:

FIG. 1 is a schematic diagram of interaction between a first user terminal and a base station and interaction between the first user terminal and a second user terminal according to an embodiment of the present disclosure;

FIG. 2 is a flowchart of a first embodiment of a sidelink DRX method according to the present disclosure;

FIG. 3 is a flowchart of a second embodiment of a sidelink DRX method according to the present disclosure;

FIG. 12 is a flowchart of a first embodiment of a sidelink DTX method according to the present disclosure;

FIG. 13 is a flowchart of a second embodiment of a sidelink DTX method according to the present disclosure;

FIG. 14 is a timing diagram of a first embodiment of a sidelink DTX method according to the present disclosure;

DETAILED DESCRIPTION

Figure 4:
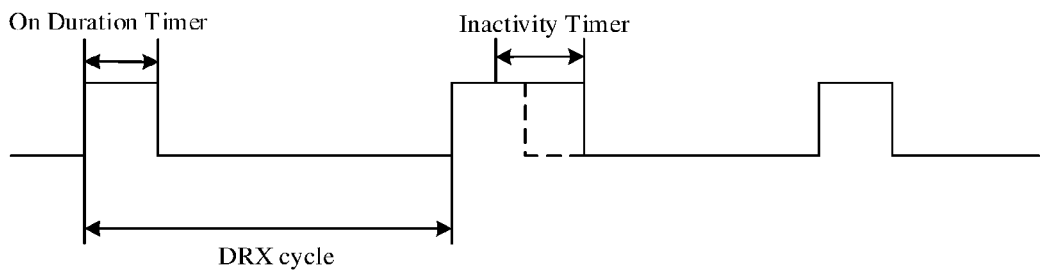
FIG. 4 is a timing diagram of a first embodiment of a sidelink DRX method according to the present disclosure.

To clearly states the objectives, technical solutions, and advantages of the present disclosure, the technical solutions of the present disclosure will be clearly and completely described below with reference to specific embodiments of the present disclosure and the accompanying drawings. Apparently, the described embodiments are some embodiments rather than all the embodiments of the present disclosure. All other embodiments obtained by a person of ordinary skill in the art based on the embodiments of the present disclosure without creative efforts shall fall within the protection scope of the present disclosure.

The technical solutions in the embodiments of the present disclosure can be applied to various communication systems such as a Global System for Mobile communications (GSM)) system, a code division multiple access (CDMA) system, a wideband code division multiple access (WCDMA) system, a general packet radio service (GPRS), LTE advanced (LTE-A), and NR (new radio).

UE, also referred to as a terminal device (Mobile Terminal), mobile user equipment, or the like, may communicate with one or more core networks through a radio access network (RAN). The UE may be a terminal device, such as a mobile phone (or referred to as a "cellular" phone) or a computer with a terminal device, and for example, may be a portable, pocket-sized, handheld, computer built-in, or in-vehicle mobile apparatus exchanging language and/or data with the RAN.

A base station may be a base transceiver station (BTS) in the GSM or CDMA, or may be a NodeB (NodeB) in WCDMA, or may be an evolved NodeB (evolutional Node B, eNB, or e-NodeB) in LTE, or may be a next-generation NodeB (gNB) in a future 5G network, which is not limited in the present disclosure. However, for the convenience of description, descriptions are provided by using a gNB as an example in the following embodiments.

A Long Term Evolution (LTE) system supports sidelink communications, allowing direct data transmission between UEs without going through a base station. The current sidelink communication mainly includes transmission forms: broadcast, groupcast, and unicast.

Discontinuous reception (DRX): DRX is configured on a user terminal for power saving. A user terminal in a DRX state does not need to connect to or monitor a control channel, so as to save power. However, in a case that the user terminal does not monitor the control channel for a long time, once data arrives, a data transmission latency may be increased. To balance power saving and the transmission latency reduction, a time in which the user terminal monitors the channel may be divided into a long DRX cycle and a short DRX cycle according to the length of the time in which the user terminal monitors the channel. In a case that data arrives at the user terminal relatively frequently or a service is sensitive to a latency, a DRX short cycle can be configured. In a case that data on the user terminal is relatively sparse, and a service is insensitive to a latency, a DRX long cycle can be configured.

DRX on duration monitoring timer (OnDuration timer): During running of the DRX on duration monitoring timer, the user terminal needs to continuously monitor a physical downlink control channel (Physical Downlink Control Channel, PDCCH) of a network.

DRX on duration transmit timer (OnDuration timer): During running of a DRX on duration transmit timer, it is allowed to perform data scheduling/transmission.

DRX inactivity timer: After a user terminal receives the first symbol of PDCCH signaling for data scheduling, the DRX inactivity timer is started, and during running of the DRX inactivity timer, the user terminal needs to continuously monitor the control channel or allow performing data scheduling/transmission.

Hybrid automatic repeat request (HARQ) RTT timer (Round-Trip Time Timer): A length of the HARQ RTT timer is a minimum time interval between a HARQ feedback moment to a moment of receiving HARQ retransmission for the process. Only when data corresponding to a current process is not successfully decoded, the user terminal starts the timer at the first symbol after the HARQ NACK feedback of the process. In a case that only the HARQ RTT timer is run on the current terminal, the user terminal does not need to monitor the PDCCH or allow performing data scheduling/transmission.

Retransmission timer: After the HARQ RTT timer expires, the retransmission timer is started at a next symbol. When the retransmission timer is running, the user terminal monitors the control channel of the network or allows performing data scheduling/transmission. In a case that scheduling/data for the process is received, the retransmission timer is started.

The following describes in detail the technical solutions provided in the present disclosure with reference to the accompanying drawings.

The present disclosure provides a sidelink DRX method, applicable to a first user terminal 101. In other words, the method may be performed by software or hardware installed on a terminal device. As shown in FIG. 1, the first user terminal 101 and a second user terminal 102 communicate with each other through a sidelink (that is, the first user terminal 101 and the second user terminal 102 communicate with each other using a sidelink interface). The second user terminal 102 and a base station 103 communicate with each other using a 3G/4G/5G network. As shown in FIG. 2, the method includes the following steps:

S21: Monitor data scheduling/transmission or receive data scheduling/transmission under control of a timer based on a DRX mechanism during running of a target receive timer in the timer.

Obviously, the foregoing monitoring data scheduling/transmission or receiving data scheduling/transmission is performed based on the sidelink. In DRX mechanism-based control, a plurality of target receive timers in the timer may be run simultaneously or one target receive timer is run individually. It may be understood that monitoring data scheduling/transmission or receiving data scheduling/transmission is stopped after the target receive timer in the timer is turned off.

In addition, a configuration method for the DRX mechanism may be that: The second user terminal 102 reports service parameters and power saving requirements to the base station 103. The base station 103 generates DRX mechanism data according to the service parameters and the power saving requirements. Then, the second user terminal 102 receives and configures DRX mechanism data delivered by the base station 103. Further, the first user terminal 101 receives, through the sidelink, and configures the DRX mechanism data sent by the second user terminal 102. In addition, the configuration method for the DRX mechanism may alternatively be that: The second user terminal 102 directly generates, according to service parameters and power saving requirements, and configures DRX mechanism data, and then, sends the DRX mechanism data to the first user terminal 101. Certainly, the configuration method of the DRX mechanism is not limited to only the foregoing two, which are merely examples for description herein.

In the sidelink DRX method provided in this embodiment of the present disclosure, when the user terminals communicate with each other through a sidelink, data scheduling/transmission is monitored or received under control of a timer based on a DRX mechanism only during running of a target receive timer in the timer, so that power saving requirements on both sides of communication can be satisfied.

Optionally, in an implementation, the target receive timer includes an on duration monitoring receive timer and an inactivity receive timer. As shown in FIG. 3, S21 includes the following steps:

S31: Monitor data scheduling/transmission from the second user terminal 102 during running of the on duration monitoring receive timer.

S32: Start, in a case that the data scheduling/transmission from the second user terminal 102 is received, the inactivity receive timer to continuously monitor the data scheduling/transmission from the second user terminal 102.

S33: During running of the inactivity receive timer, in a case that the data scheduling/transmission transmitted by the second user terminal 102 is received again, restart the inactivity receive timer.

It may be understood that when both the on duration monitoring receive timer and the inactivity receive timer expire, monitoring the data scheduling/transmission from the second user terminal 102 is stopped, to satisfy power saving requirements of the first user terminal.

For example, as shown in FIG. 4, a protruding portion in a Y (vertical) direction in FIG. 4 represents that data scheduling/transmission from the second user terminal 102 is being monitored, a low flat portion in the Y direction represents a sleep state (that is, stopping monitoring data scheduling/transmission from the second user terminal 102), and an X (horizontal) direction is a time axis. For example, a DRX cycle is set to 40 ms, a running duration of the on duration monitoring receive timer is set to 5 ms, and a running duration of the inactivity receive timer is set to 8 ms. According to starting moments of the target receive timer and on duration monitoring receive timer in the configured DRX mechanism, the on duration monitoring receive timer starts to be run, and in this case, the first user terminal 101 monitors and receives data scheduling/transmission. For example, assuming that a starting position of the on duration monitoring receive timer is 0, data scheduling/transmission from the second user terminal 102 monitored by the first user terminal 101 within 0 to 5 ms is received. In a case that the data scheduling/transmission is not received, the sleep state is entered within 5 to 40 ms, and 40 ms to 80 ms is the second DRX cycle. In 40 ms to 45 ms, the on duration monitoring receive timer monitors data scheduling/transmission. In a case that the data scheduling/transmission is received at 44 ms, the inactivity receive timer is started at 44 ms, and the inactivity receive timer is effective within 44 to 52 ms. The first user terminal 101 continuously performs monitoring during this period. In a case that the data scheduling/transmission is received, the inactivity receive timer is restarted. Until the inactivity receive timer expires, the first user terminal 101 enters a sleep period. Until the next DRX cycle, the on duration monitoring receive timer wakes up again. The essence of the above is starting/restarting the on duration monitoring receive timer when the data scheduling/transmission is received, to prolong the time of monitoring the data scheduling/transmission.

It should be noted that the data scheduling/transmission causing the starting/restarting of the inactivity receive timer may refer to only newly transmitted data or may include both newly transmitted data and retransmitted data. The two can be configured/selected.

Figure 5:
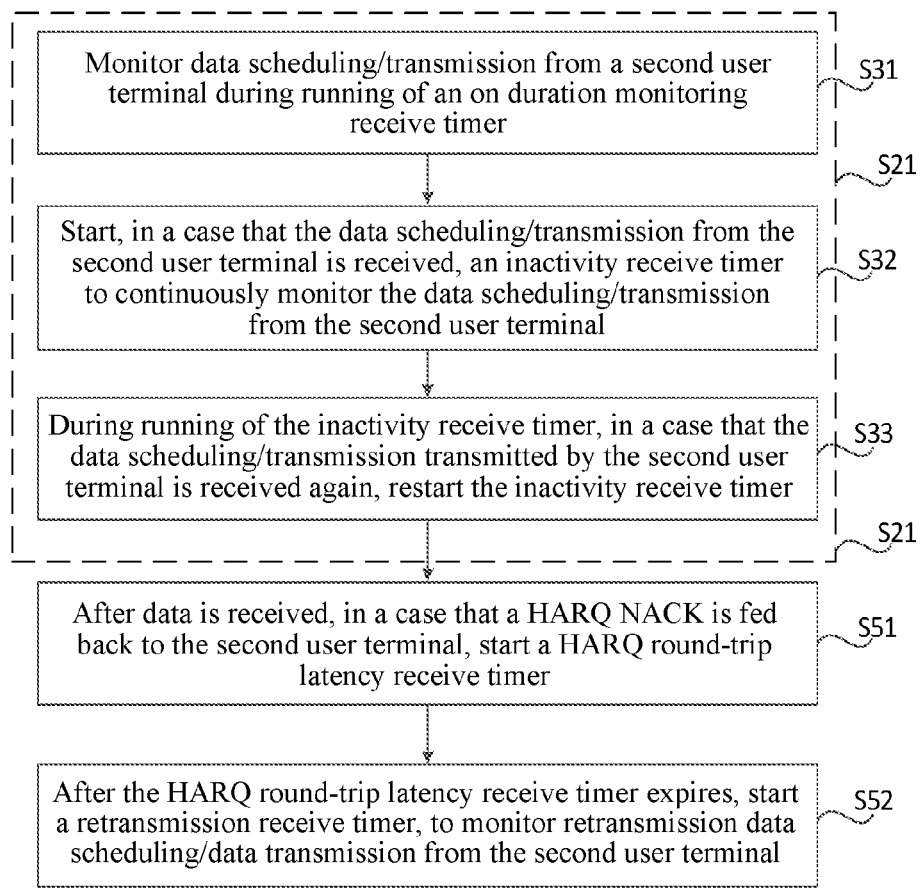
FIG. 5 is a flowchart of a third embodiment of a sidelink DRX method according to the present disclosure.

In another implementation, the first user terminal 101 is further configured with a HARQ feedback mechanism. The timer further includes a HARQ round-trip latency receive timer. The target receive timer further includes a retransmission receive timer. As shown in FIG. 5, the method further includes S51 and S52.

S51: After data is received, in a case that a HARQ NACK is fed back to the second user terminal 102, start the HARQ round-trip latency receive timer.

When the data is received, in a case that data packet loss is found, the HARQ NACK is fed back to the second user terminal 102 to inform the second user terminal 102 that the data scheduling/transmission needs to be performed again, to ensure the reliability of data transmission.

S52: After the HARQ round-trip latency receive timer expires, start the retransmission receive timer, to monitor retransmission data scheduling/data transmission from the second user terminal 102.

When the HARQ round-trip latency receive timer is run, in a case that the target receive timer is run simultaneously, data scheduling/transmission is monitored. In a case that no target receive timer is nm simultaneously, monitoring the data scheduling/transmission is stopped, so as to satisfy power saving requirements of the first user terminal 101.

Figure 6:
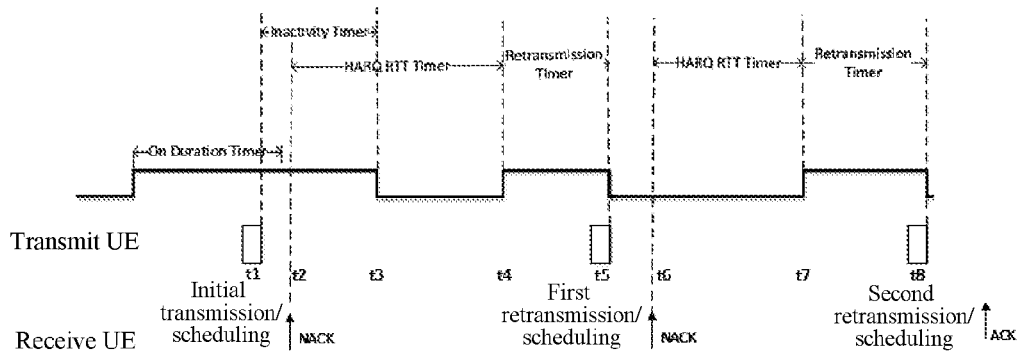
FIG. 6 is a timing diagram of a second embodiment of a sidelink DRX method according to the present disclosure.

For example, as shown in FIG. 6, a protruding portion in a Y (vertical) direction in FIG. 6 represents being in a state of monitoring data scheduling/transmission, a low flat portion in a Y (vertical) direction represents a sleep state, and an X (horizontal) direction is a time axis. In a case that the data scheduling/transmission is received at a moment t1, the inactivity receive timer is started. In a case that the second user terminal 102 feeds back a HARQ NACK at a moment t2, the HARQ round-trip latency receive timer is started, and the inactivity receive timer expires at a moment t3. It can be learned that between moments t3 and t4, because none of the target receive timers is effective, the first user terminal 101 may stop monitoring the data scheduling/transmission. In a case that the HARQ round-trip latency receive timer expires at the moment t4, the retransmission receive timer is started, for starting to monitor data retransmission/scheduling. The first retransmission/scheduling is received at a moment t5, and the retransmission receive timer is turned off. In a case that the HARQ NACK is still fed back for the first retransmission at a moment t6, the HARQ round-trip latency receive timer is restarted, and the first user terminal 101 may stop monitoring data scheduling/transmission. In a case that the HARQ round-trip latency receive timer expires at a moment t7, the retransmission receive timer is restarted, for starting to monitor the data retransmission/scheduling. In a case that the second retransmission/scheduling is received at a moment t8, the retransmission receive timer is turned off, and the second user terminal 102 stops monitoring the data scheduling/transmission, and then, feeds back a reception success acknowledgment for the second retransmission, so that the HARQ process ends. Data scheduling/transmission is not monitored until an on duration monitoring receive timer of a next DRX cycle is run.

Figure 7:
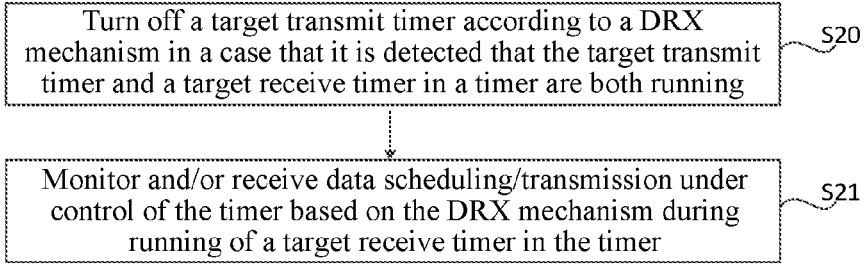
FIG. 7 is a flowchart of a fourth embodiment of a sidelink DRX method according to the present disclosure.

It may be understood that in this embodiment of the present disclosure, the foregoing first user terminal 101 is used as receive-end UE. In fact, any user terminal may be used as both receive-end UE and transmit-end UE in different stages. Therefore, when two user terminals interact with each other, receive-end UE and transmit-end UE need to be determined first. Optionally, the timer further includes a target transmit timer. Before S21, as shown in FIG. 7, the method further includes S20.

S20: Turn off the target transmit timer according to the DRX mechanism in a case that it is detected that the target transmit timer and a target receive timer in the timer are both running. It is agreed in the DRX mechanism that a send priority of the second user terminal 102 is higher than a send priority of the first user terminal 101.

It may be understood that, when the target receive timer of the first user terminal 101 is running, because the first user terminal 101 and the second user terminal 102 have the same DRX mechanism, correspondingly a target transmit timer of the second user terminal 102 is also running. In view of the above, when the target transmit timer and the target receive timer are both running, both the first user terminal 101 and the second user terminal 102 have demands for sending data. Because the user terminal is limited by factors such as hardware and interference, it is difficult to perform receiving and sending simultaneously. In this case, data scheduling/transmission needs to be performed on the first user terminal 101 and the second user terminal 102 for coordination, to ensure the data reception effect and the power saving property. Therefore, it is necessary to determine, using the send priorities, which user terminal sends data first.

According to the DRX mechanism, in one of the implementations, the send priority of the first user terminal 101 relative to the second user terminal 102 is determined according to a highest priority level of at least one to-be-processed service parameter of the first user terminal 101 and a highest priority level of at least one to-be-processed service parameter of the second user terminal 102 that are pre-configured.

For example, the first user terminal 101 includes three service parameters A, B, and C, and their send priorities are respectively 2, 2, and 3. The second user terminal 102 includes three service parameters D, E, and F, and their send priorities are respectively 1, 2, and 3. It can be seen that the highest priority level of the to-be-processed service parameters of the first user terminal 101 is 2, and the highest priority level of the to-be-processed service parameters of the second user terminal 102 is 1. In view of the above, the highest priority level of the second user terminal 102 is higher than the highest priority level of the first user terminal 101. Therefore, it is determined that the second user terminal 102 preferentially sends data.

According to the DRX mechanism, in another implementation, the send priority of the first user terminal 101 relative to the second user terminal 102 is alternatively determined according to a type of the target transmit timer that is run on the first user terminal 101 and a type of the target receive timer that is run on the first user terminal 101.

For example, it is agreed in the DRX mechanism that the priority of the retransmission transmit timer is higher than the priority of the on duration monitoring receive timer. When the on duration transmit timer and the retransmission receive timer of the first user terminal 101 are run simultaneously, the on duration monitoring receive timer and the retransmission transmit timer of the second user terminal 102 are also run simultaneously. In this case, the on duration transmit timer of the first user terminal 101 and the on duration monitoring receive timer of the second user terminal 102 are turned off. In this case, only the retransmission transmit timer of the second user terminal 102 and the retransmission receive timer of the first user terminal 101 are run, that is, the retransmission data is preferentially sent.

According to the DRX mechanism, in another implementation, the send priority of the first user terminal 101 relative to the second user terminal 102 is alternatively determined according to a moment at which the target transmit timer that is run on the first user terminal 101 is run and a moment at which the target receive timer that is run on the first user terminal 101 is run.

For example, in a case that the configured DRX cycle is 640 ms, and it is agreed in the DRX mechanism that: in 0 to 320 ms of the DRX cycle, the send priority of the first user terminal 101 is higher than the send priority of the second user terminal, and in 320 to 640 ms, the send priority of the second user terminal 102 is higher than the send priority of the first user terminal 101, in 0 to 320 ms of the DRX cycle, the first user terminal 101 may start the target transmit timer according to the DRX mechanism, and the second user terminal 102 may start the target receive timer according to the DRX mechanism, to determine that the first user terminal 101 preferentially sends data, and in 320 to 640 ms of the DRX cycle, the second user terminal 102 may start the target transmit timer according to the DRX mechanism, and the first user terminal 101 may start the target receive timer according to the DRX mechanism, to determine that the second user terminal 102 preferentially sends data.

In another example, in a case that the configured DRX cycle is 640 ms, and it is agreed in the DRX mechanism that: a starting point of the on duration transmit timer of the first user terminal 101 is 0 ms, an on duration transmit timer of the second user terminal 102 is 160 ms, the send priority of the first user terminal 101 is higher than the send priority of the second user terminal 102 in 0 to 160 ms, and the send priority of the second user terminal 102 is higher than the send priority of the first user terminal 101 in 160 to 640 ms. It may be understood that in a period of from 0 to 160 ms in the DRX cycle, the first user terminal 101 may start, according to the DRX mechanism, the on duration transmit timer within a configured time period starting from 0 ms (for example, 0 to 20 ms or 0 to 40 ms) in the period of from 0 to 160 ms, and the second user terminal 102 may start, according to the DRX mechanism, the on duration monitoring timer within a configured time period starting from 0 ms for example, 0 to 20 ms or 0 to 40 ms) in the period of from 0 to 160 ms, to determine that the first user terminal 101 preferentially sends data. In a period of from 160 to 640 ms in the DRX cycle, the second user terminal 102 may start, according to the DRX mechanism, the on duration transmit timer within a configured time period starting from 160 ms (for example, 160 to 180 ms or 160 to 200 ms) in the period of from 160 to 640 ms, and the first user terminal 101 may start, according to the DRX mechanism, the on duration monitoring timer within a configured time period starting from 160 ms for example, 160 to 180 ms or 160 to 200 ms) in the period of from 160 to 640 ms, to determine that the second user terminal 102 preferentially sends data.

It may be understood that the foregoing method of determining the send priority of the first user terminal 101 relative to the second user terminal 102 is merely an example for description, which may be determined according to actual requirements in specific applications.

Figure 8:
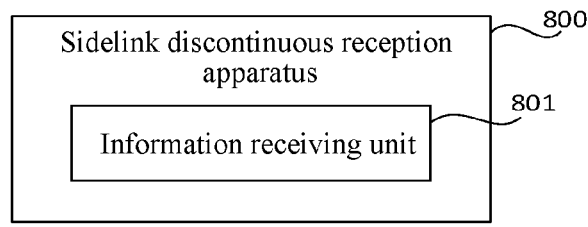
FIG. 8 is a block diagram of functional units of a first embodiment of a sidelink DRX apparatus according to the present disclosure.

Referring to FIG. 8, the present disclosure further provides a sidelink DRX apparatus 800, applicable to a first user terminal 101. It should be noted that the basic principle and the produced technical effects of the sidelink DRX apparatus 800 provided by the present disclosure are the same as those in the foregoing embodiment. For convenience and conciseness of description, for the parts not mentioned in this apparatus embodiment, refer to corresponding content in the embodiment of the sidelink DRX method provided above. As shown in FIG. 1, the first user terminal 101 and a second user terminal 102 communicate with each other through a sidelink (that is, the first user terminal 101 and the second user terminal 102 communicate with each other using a sidelink interface). The first user terminal 101 and a base station 103 communicate with each other using a 3G/4G/5G network. As shown in FIG. 8, the sidelink DRX apparatus 800 includes:

an information receiving unit 801, configured to monitor data scheduling/transmission or receive data scheduling/transmission under control of a timer based on a DRX mechanism during running of a target receive timer in the timer.

Obviously, the foregoing monitoring data scheduling/transmission or receiving data scheduling/transmission is performed based on the sidelink. In DRX mechanism-based control, a plurality of target receive timers in the timer may be run simultaneously or one target receive timer is run individually. It may be understood that monitoring data scheduling/transmission or receiving data scheduling/transmission is stopped after the target receive timer in the timer is turned off.

In addition, a configuration method for the DRX mechanism may be that: The second user terminal 102 reports service parameters and power saving requirements to the base station 103. The base station 103 generates DRX mechanism data according to the service parameters and the power saving requirements. Then, the second user terminal 102 receives and configures DRX mechanism data delivered by the base station 103. Further, the first user terminal 101 receives, through the sidelink, and configures the DRX mechanism data sent by the second user terminal 102. In addition, the configuration method for the DRX mechanism may alternatively be that: The second user terminal 102 directly generates, according to service parameters and power saving requirements, and configures DRX mechanism data, and then, sends the DRX mechanism data to the first user terminal 101. Certainly, the configuration method of the DRX mechanism is not limited to only the foregoing two, which are merely examples for description herein.

In the sidelink DRX apparatus 800 provided in this embodiment of the present disclosure, when the user terminals communicate with each other through a sidelink, data scheduling/transmission is monitored or received under control of a timer based on a DRX mechanism only during running of a target receive timer in the timer, so that power saving requirements on both sides of communication can be satisfied.

Optionally, the target receive timer includes an on duration monitoring receive timer and an inactivity receive timer. Specifically, the information receiving unit 801 is configured to monitor data scheduling/transmission from the second user terminal 102 during running of the on duration monitoring receive timer.

Figure 9:
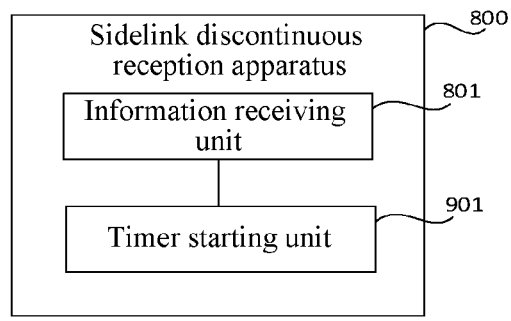
FIG. 9 is a block diagram of functional units of a second embodiment of a sidelink DRX apparatus according to the present disclosure.

As shown FIG. 9, the apparatus 800 further includes a timer starting unit 901, configured to start, in a case that the data scheduling/transmission from the second user terminal 102 is received, the inactivity receive timer to continuously monitor the data scheduling/transmission from the second user terminal 102.

The timer starting unit 901 can be further configured to restart the inactivity receive timer during running of the inactivity receive timer in a case that the data scheduling/transmission transmitted by the second user terminal 102 is received again.

Figure 10:
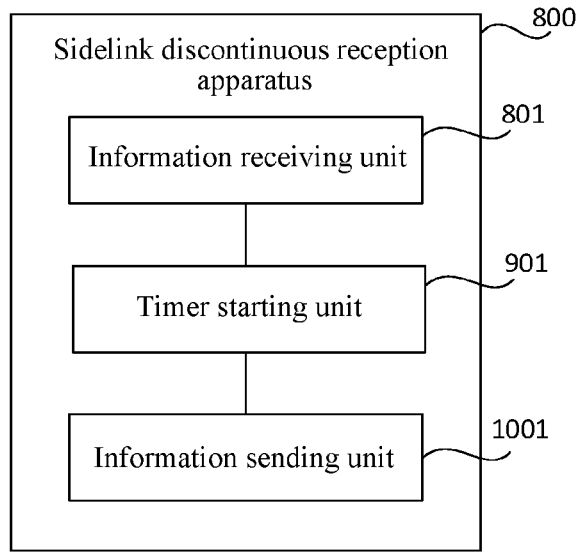
FIG. 10 is a block diagram of functional units of a third embodiment of a sidelink DRX apparatus according to the present disclosure.

Optionally, the first user terminal 101 is further configured with a HARQ feedback mechanism. The timer further includes a HARQ round-trip latency receive timer. The target receive timer further includes a retransmission receive timer. As shown in FIG. 10, the apparatus 800 further includes:

an information sending unit 1001, configured to start the HARQ round-trip latency receive timer after data is received in a case that a HARQ NACK is fed back to the second user terminal 102.

The timer starting unit 901 may be further configured to start the retransmission receive timer after the HARQ round-trip latency receive timer expires, to monitor retransmission data scheduling/data transmission from the second user terminal 102.

Figure 11:
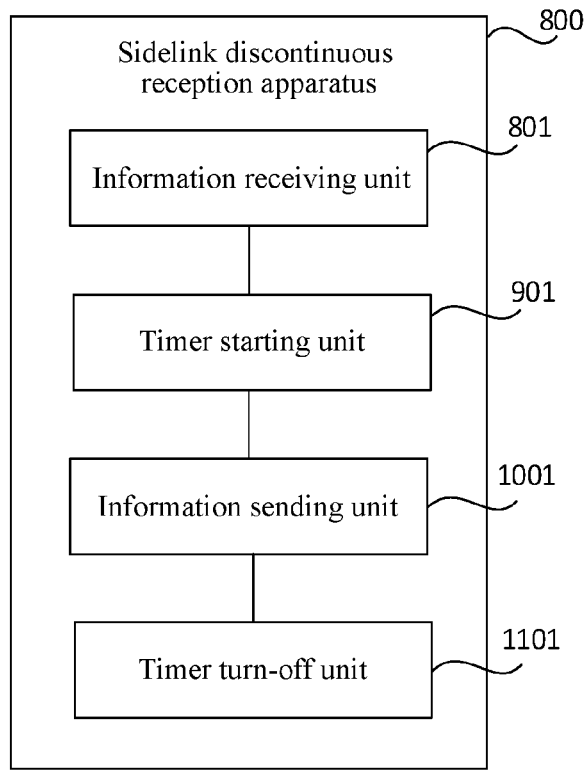
FIG. 11 is a block diagram of functional units of a fourth embodiment of a sidelink DRX apparatus according to the present disclosure.

The timer further includes a target transmit timer. As shown in FIG. 11, the apparatus 800 further includes:

a timer turn-off unit 1101, configured to turn off the target transmit timer according to the DRX mechanism in a case that it is detected that the target transmit timer and a target receive timer in the timer are both running, where it is agreed in the DRX mechanism that a send priority of the second user terminal 102 is higher than a send priority of the first user terminal 101.

Specifically, according to the DRX mechanism, the send priority of the first user terminal 101 relative to the second user terminal 102 may be determined according to a highest priority level of at least one to-be-processed service parameter of the first user terminal 101 and a highest priority level of at least one to-be-processed service parameter of the second user terminal 102 that are pre-configured.

According to the DRX mechanism, the send priority of the first user terminal 101 relative to the second user terminal 102 is alternatively determined according to a type of the target transmit timer that is run on the first user terminal 101 and a type of the target receive timer that is run on the first user terminal 101.

According to the DRX mechanism, the send priority of the first user terminal 101 relative to the second user terminal 102 is determined according to a moment at which the target transmit timer that is run on the first user terminal 101 is run and a moment at which the target receive timer that is run on the first user terminal 101 is run.

The present disclosure provides a sidelink DTX method, applicable to a second user terminal 102. As shown in FIG. 1, the second user terminal 102 and first user terminal 101 communicate with each other through a sidelink (that is, the user terminals communicate with each other using a sidelink interface). The second user terminal 102 and a base station 103 communicate with each other using a 3G/4G/5G network. As shown in FIG. 12, the sidelink DTX method includes the following steps:

S121: Allow performing data scheduling/transmission to the first user terminal 101, or perform data scheduling/transmission to the first user terminal 101 under control of a timer based on a DRX mechanism during running of a target transmit timer in the timer.

Obviously, the foregoing allowing performing data scheduling/transmission to the first user terminal 101 or performing data scheduling/transmission to the first user terminal 101 is performed based on the sidelink. In DRX mechanism-based control, a plurality of target receive timers in the timer may be run simultaneously or one target receive timer is run individually. It may be understood that after the target transmit timer in the timer is turned off, allowing performing data scheduling/transmission to the first user terminal 101, or performing data scheduling/transmission to the first user terminal 101 is stopped.

In addition, a configuration method for the DRX mechanism may be that: The second user terminal 102 reports service parameters and power saving requirements to the base station 103. The base station 103 generates DRX mechanism data according to the service parameters and the power saving requirements. Then, the second user terminal 102 receives and configures DRX mechanism data delivered by the base station 103. Further, the first user terminal 101 receives, through the sidelink, and configures the DRX mechanism data sent by the second user terminal 102. In addition, the configuration method for the DRX mechanism may alternatively be that: The second user terminal 102 directly generates, according to service parameters and power saving requirements, and configures DRX mechanism data, and then, sends the DRX mechanism data to the first user terminal 101. Certainly, the configuration method of the DRX mechanism is not limited to only the foregoing two, which are merely examples for description herein.

In the sidelink DTX method provided in this embodiment of the present disclosure, when the user terminals communicate with each other through a sidelink, it is allowed to perform data scheduling/transmission to the first user terminal 101 or data scheduling/transmission to the first user terminal 101 is performed under control of a timer based on a DRX mechanism only during running of a target receive timer in the timer, so that power saving requirements on both sides of communication can be satisfied.

Optionally, the target transmit timer includes an on duration transmit timer and an inactivity transmit timer. As shown in FIG. 13, S121 includes the following steps:

S131: Allow performing data scheduling/transmission to the first user terminal 101 during running of the on duration transmit timer.

S132: Start, in a case that data scheduling/transmission to the first user terminal 101 is performed, the inactivity transmit timer to continuously allow performing data scheduling/transmission to the first user terminal 101.

S133: Restart the inactivity transmit timer in a case that data scheduling/transmission to the first user terminal 101 is performed again during running of the inactivity transmit timer.

When the on duration transmit timer and the inactivity transmit timer both expire, allowing performing data scheduling/transmission to the second user terminal 102 is stopped.

For example, as shown in FIG. 14, a protruding portion in a Y (vertical) direction in FIG. 14 represents that data scheduling/transmission from the second user terminal 102 is being allowed, a low flat portion in the Y direction represents a sleep state (that is, stopping allowing data scheduling/transmission from the second user terminal 102), and an X (horizontal) direction is a time axis. For example, a DRX cycle is set to 40 ms, a running duration of the on duration transmit timer is set to 5 ms, and a running duration of the inactivity transmit timer is set to 8 ms. According to starting moments of the target receive timer and on duration transmit timer in the configured DRX mechanism, the on duration transmit timer starts to be run, and in this case, the second user terminal 102 allows data scheduling/transmission. For example, assuming that a starting position of the on duration transmit timer is 0, the second user terminal 102 allows data scheduling/transmission within 0 to 5 ms, and in a case that data scheduling/transmission is not performed, the second user terminal 102 enters a sleep state within 5 to 40 ms. 40 ms to 80 ms is the second DRX cycle, the on duration transmit timer allows data scheduling/transmission within 40 ms to 45 ms. In a case that data scheduling/transmission is performed at 44 ms, the inactivity transmit timer is started at 44 ms. The inactivity transmit timer is effective within 44 to 52 ms, and in this period, the second user terminal 102 continuously allows data scheduling/transmission. In a case that data scheduling/transmission is sent, the inactivity transmit timer is restarted. Until the inactivity transmit timer expires, the second user terminal 102 enters a sleep period. Until a next DRX cycle, the on duration transmit timer wakes up again. The essence of the above is starting/restarting the on duration transmit timer when the data scheduling/transmission is sent, to prolong the time of allowing performing the data scheduling/transmission.

It should be noted that the starting/restarting of the inactivity transmit timer caused by performing the data scheduling/transmission may refer to only newly transmitted data or may include both newly transmitted data and retransmitted data. The two can be configured/selected.

Figure 15:
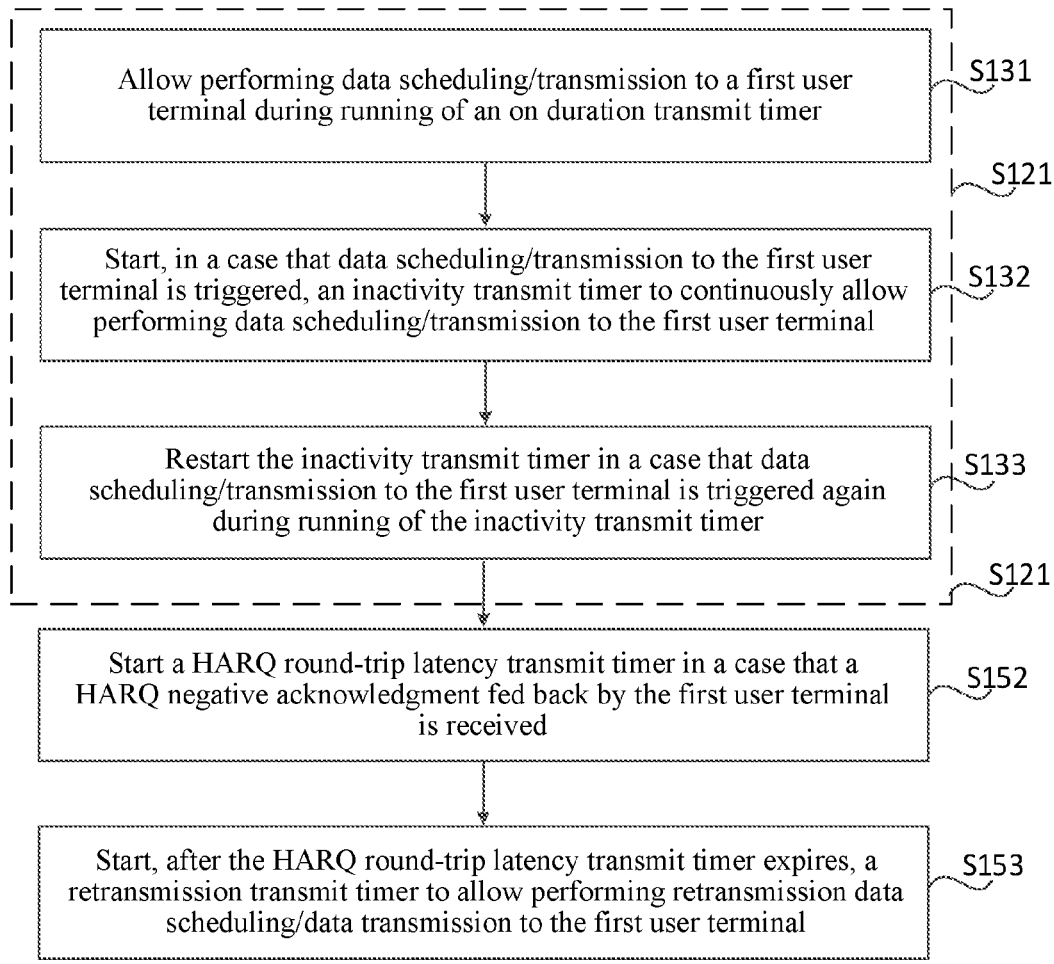
FIG. 15 is a flowchart of a third embodiment of a sidelink DTX method according to the present disclosure.

Optionally, the second user terminal 102 is further configured with a HARQ retransmission mechanism. The timer further includes a HARQ round-trip latency transmit timer. The target transmit timer further includes a retransmission transmit timer. As shown in FIG. 15, the method further includes S152 and S153.

S152: Start the HARQ round-trip latency transmit timer in a case that a HARQ NACK fed back by the first user terminal 101 is received.

S153: Start, after the HARQ round-trip latency transmit timer expires, the retransmission transmit timer to allow performing retransmission data scheduling/data transmission to the first user terminal 101.

When data sent by the first user terminal 101 is received, a HARQ NACK fed back by the first user terminal 101 is received, indicating that data transmission fails. Therefore, data scheduling/transmission needs to be performed again.

Figure 16:
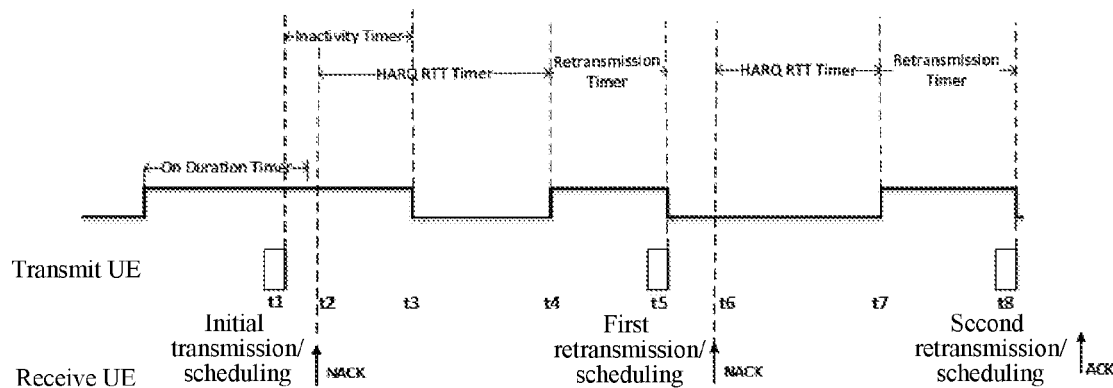
FIG. 16 is a timing diagram of a second embodiment of a sidelink DTX method according to the present disclosure.

For example, as shown in FIG. 16, a protruding portion in a Y (vertical) direction in FIG. 16 represents being in a state of monitoring data scheduling/transmission, a low flat portion in a Y (vertical) direction represents a sleep state, and an X (horizontal) direction is a time axis. In a case that the data scheduling/transmission is sent at a moment t1, the inactivity transmit timer is started. In a case that a HARQ NACK fed back by the first user terminal 101 is received at a moment t2, the HARQ round-trip latency transmit timer is started, and the inactivity transmit timer expires at a moment t3. It can be learned that between moments t3 and t4, because none of the target transmit timers is effective, the second user terminal 102 may stop allowing the data scheduling/transmission. In a case that the HARQ round-trip latency transmit timer expires at the moment t4, the retransmission transmit timer is started, for starting to allow data retransmission/scheduling. The first retransmission/scheduling is performed at a moment t5, and the retransmission transmit timer is turned off. In a case that the HARQ NACK fed back by the first user terminal 101 for the first retransmission is received at a moment t6, the HARQ round-trip latency transmit timer is restarted, and the second user terminal 102 may stop allowing the data scheduling/transmission. In a case that the HARQ round-trip latency transmit timer expires at a moment t7, the retransmission transmit timer is restarted, for starting to allow the data retransmission/scheduling. In a case that the second retransmission/scheduling is sent at a moment t8, the retransmission transmit timer is turned off, and the second user terminal 102 stops allowing the data scheduling/transmission, and then, feeds back a reception success acknowledgment for the second retransmission, so that the HARQ process ends. Data scheduling/transmission is not allowed until an on duration transmit timer of a next DRX cycle is run.

Figure 17:
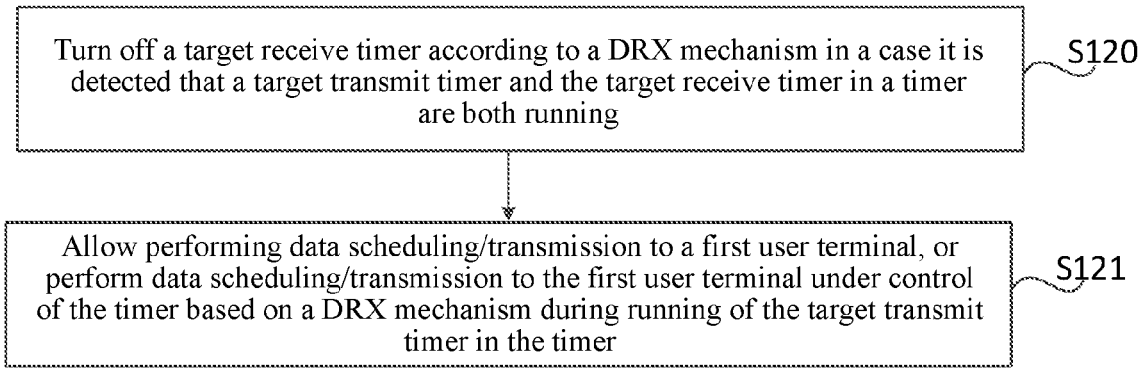
FIG. 17 is a flowchart of a fourth embodiment of a sidelink DTX method according to the present disclosure.

It may be understood that in this embodiment of the present disclosure, the foregoing second user terminal 102 is used as transmit-end UE. In fact, any user terminal may be used as both receive-end UE and transmit-end UE in different stages. Therefore, when two user terminals interact with each other, receive-end UE and transmit-end UE need to be determined first. Optionally, the timer further includes a target receive timer. Before S121, as shown in FIG. 17, the method further includes:

S120: Turn off the target receive timer according to the DRX mechanism in a case that it is detected that a target transmit timer and the target receive timer in the timer are both running.

It is agreed in the DRX mechanism that a send priority of the second user terminal 102 is higher than a send priority of the first user terminal 101. It may be understood that when the target receive timer of the second user terminal 102 is running, because the first user terminal 101 and the second user terminal 102 have the same DRX mechanism, correspondingly a target transmit timer of the first user terminal 101 is also running. In view of the above, when the target transmit timer and the target receive timer are both running, both the first user terminal 101 and the second user terminal 102 have demands for sending data. Because the user terminal is limited by factors such as hardware and interference, it is difficult to perform receiving and sending simultaneously. In this case, data scheduling/transmission needs to be performed on the first user terminal 101 and the second user terminal 102 for coordination, to ensure the data reception effect and the power saving property. Therefore, it is necessary to determine, using the send priorities, which user terminal sends data first.

Optionally, according to the DRX mechanism, in one of the implementations, the send priority of the first user terminal 101 relative to the second user terminal 102 is determined according to a highest priority level of at least one to-be-processed service parameter of the first user terminal 101 and a highest priority level of at least one to-be-processed service parameter of the second user terminal 102 that are pre-configured.

For example, the first user terminal 101 includes three service parameters A, B, and C, and their send priorities are respectively 2, 2, and 3. The second user terminal 102 includes three service parameters D, E, and F, and their send priorities are respectively 1, 2, and 3. It can be seen that the highest priority level of the to-be-processed service parameters of the first user terminal 101 is 2, and the highest priority level of the to-be-processed service parameters of the second user terminal 102 is 1. In view of the above, the highest priority level of the second user terminal 102 is higher than the highest priority level of the first user terminal 101.

According to the DRX mechanism, in another implementation, the send priority of the first user terminal 101 relative to the second user terminal 102 is determined according to a type of the target transmit timer that is run and a type of the target receive timer that is run.

For example, it is agreed in the DRX mechanism that the priority of the retransmission transmit timer is higher than the priority of the on duration monitoring receive timer. When the on duration transmit timer and the retransmission receive timer of the first user terminal 101 are run simultaneously, the on duration monitoring receive timer and the retransmission transmit timer of the second user terminal 102 are also run simultaneously. In this case, the on duration transmit timer of the first user terminal 101 and the on duration monitoring receive timer of the second user terminal 102 are turned off. In this case, only the retransmission transmit timer of the second user terminal 102 and the retransmission receive timer of the first user terminal 101 are run, that is, the retransmission data is preferentially sent.

According to the DRX mechanism, in another implementation, the send priority of the first user terminal 101 relative to the second user terminal 102 is determined according to a moment at which the target transmit timer is running and a moment at which the running target receive timer is running.

For example, in a case that the configured DRX cycle is 640 ms, and it is agreed in the DRX mechanism that: in 0 to 320 ms of the DRX cycle, the send priority of the first user terminal 101 is higher than the send priority of the second user terminal, and in 320 to 640 ms, the send priority of the second user terminal 102 is higher than the send priority of the first user terminal 101, in 0 to 320 ms of the DRX cycle, the first user terminal 101 may start the target transmit timer according to the DRX mechanism, and the second user terminal 102 may start the target receive timer according to the DRX mechanism, to determine that the first user terminal 101 preferentially sends data, and in 320 to 640 ms of the DRX cycle, the second user terminal 102 may start the target transmit timer according to the DRX mechanism, and the first user terminal 101 may start the target receive timer according to the DRX mechanism, to determine that the second user terminal 101 preferentially sends data.

In another example, in a case that the configured DRX cycle is 640 ms, and it is agreed in the DRX mechanism that: a starting point of the on duration transmit timer of the first user terminal 101 is 0 ms, an on duration transmit timer of the second user terminal 102 is 160 ms, the send priority of the first user terminal 101 is higher than the send priority of the second user terminal 102 in 0 to 160 ms, and the send priority of the second user terminal 102 is higher than the send priority of the first user terminal 101 in 160 to 640 ms. It may be understood that in a period of from 0 to 160 ms in the DRX cycle, the first user terminal 101 may start, according to the DRX mechanism, the on duration transmit timer within a configured time period starting from 0 ms (for example, 0 to 20 ms or 0 to 40 ms) in the period of from 0 to 160 ms, and the second user terminal 102 may start, according to the DRX mechanism, the on duration monitoring timer within a configured time period starting from 0 ms for example, 0 to 20 ms or 0 to 40 ms) in the period of from 0 to 160 ms, to determine that the first user terminal 101 preferentially sends data. In a period of from 160 to 640 ms in the DRX cycle, the second user terminal 102 may start, according to the DRX mechanism, the on duration transmit timer within a configured time period starting from 160 ms (for example, 160 to 180 ms or 160 to 200 ms) in the period of from 160 to 640 ms, and the first user terminal 101 may start, according to the DRX mechanism, the on duration monitoring timer within a configured time period starting from 160 ms for example, 160 to 180 ms or 160 to 200 ms) in the period of from 160 to 640 ms, to determine that the second user terminal 102 preferentially sends data.

Optionally, the method further includes: receiving HARQ feedback after a preset interval time in a case that data scheduling/transmission to the first user terminal 101 is performed.

Figure 18:
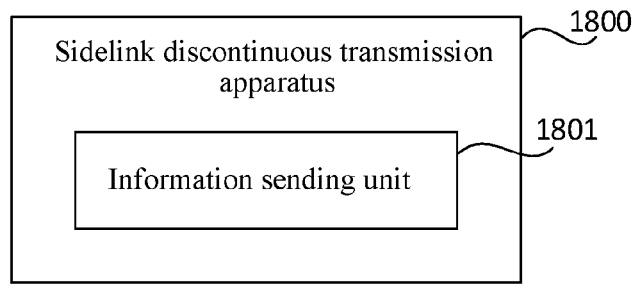
FIG. 18 is a block diagram of functional units of a first embodiment of a sidelink DTX apparatus according to the present disclosure.

Referring to FIG. 18, the present disclosure further provides a sidelink DTX apparatus 1800, applicable to a second user terminal 102. It should be noted that the basic principle and the produced technical effects of the sidelink DTX apparatus 1800 provided by the present disclosure are the same as those in the embodiment of the sidelink DTX method provided above. For convenience and conciseness of description, for the parts not mentioned in this apparatus embodiment, refer to corresponding content in the embodiment of the sidelink DTX method provided above. The apparatus 1800 includes:

an information sending unit 1801, configured to allow performing data scheduling/transmission to a first user terminal 101, or performing data scheduling/transmission to the first user terminal 101 under control of a timer based on a DRX mechanism during running of a target transmit timer in the timer.

Obviously, the foregoing allowing performing data scheduling/transmission to the first user terminal 101 or performing data scheduling/transmission to the first user terminal 101 is performed based on the sidelink. In DRX mechanism-based control, a plurality of target receive timers in the timer may be run simultaneously or one target receive timer is run individually. It may be understood that after the target transmit timer in the timer is turned off, allowing performing data scheduling/transmission to the first user terminal 101, or performing data scheduling/transmission to the first user terminal 101 is stopped.

In addition, a configuration method for the DRX mechanism may be that: The second user terminal 102 reports service parameters and power saving requirements to the base station 103. The base station 103 generates DRX mechanism data according to the service parameters and the power saving requirements. Then, the second user terminal 102 receives and configures DRX mechanism data delivered by the base station 103. Further, the first user terminal 101 receives, through the sidelink, and configures the DRX mechanism data sent by the second user terminal 102. In addition, the configuration method for the DRX mechanism may alternatively be that: The second user terminal 102 directly generates, according to service parameters and power saving requirements, and configures DRX mechanism data, and then, sends the DRX mechanism data to the first user terminal 101. Certainly, the configuration method of the DRX mechanism is not limited to only the foregoing two, which are merely examples for description herein.

In the sidelink DTX apparatus 1800 provided in this embodiment of the present disclosure, when the user terminals communicate with each other through a sidelink, it is allowed to perform data scheduling/transmission to the first user terminal 101 or data scheduling/transmission to the first user terminal 101 is performed under control of a timer based on a DRX mechanism only during running of a target receive timer in the timer, so that power saving requirements on both sides of communication can be satisfied.

The target transmit timer includes an on duration transmit timer and an inactivity transmit timer. The information sending unit 1801 is further configured to allow performing data scheduling/transmission to the first user terminal 101 during running of the on duration transmit timer.

Figure 19:
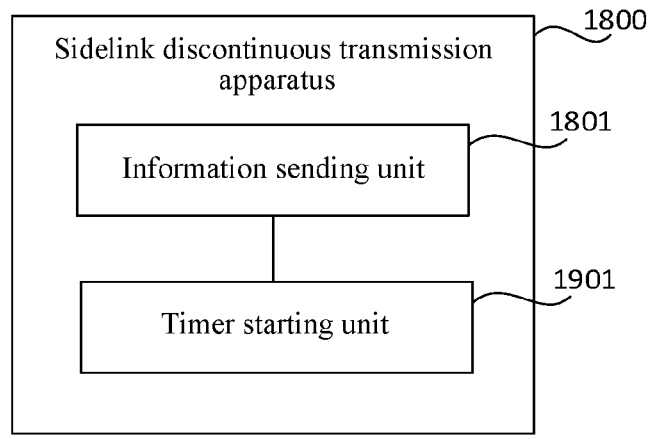
FIG. 19 is a block diagram of functional units of a second embodiment of a sidelink DTX apparatus according to the present disclosure.

As shown FIG. 19, the apparatus 1800 further includes a timer starting unit 1901, configured to start, in a case that the data scheduling/transmission to the first user terminal 101 is performed, the inactivity transmit timer to continuously allow performing data scheduling/transmission to the first user terminal 101.

The timer starting unit 1901 is further configured to restart the inactivity transmit timer in a case that data scheduling/transmission to the first user terminal 101 is performed again during running of the inactivity transmit timer.

The second user terminal 102 is further configured with a HARQ retransmission mechanism. The timer further includes a HARQ round-trip latency transmit timer. The target transmit timer further includes a retransmission transmit timer.

The timer starting unit 1901 is further configured to start the HARQ round-trip latency transmit timer in a case that a HARQ NACK fed back by the first user terminal 101 is received.

The timer starting unit 1901 is further configured to start, after the HARQ round-trip latency transmit timer expires, the retransmission transmit timer to allow performing retransmission data scheduling/data transmission to the first user terminal 101.

Figure 20:
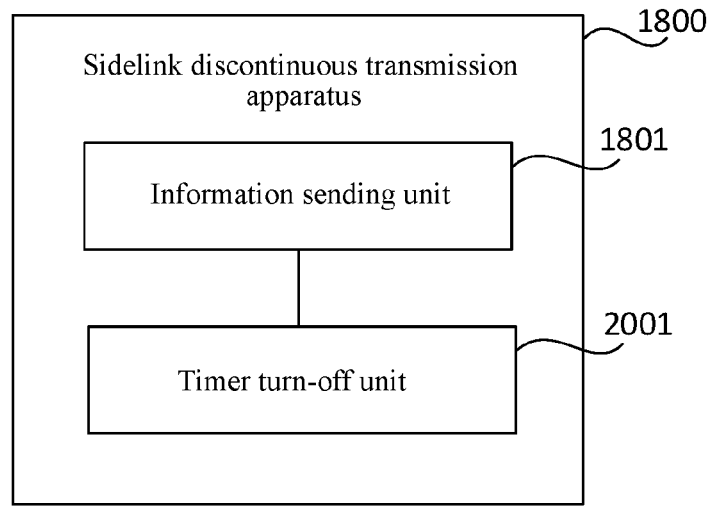
FIG. 20 is a block diagram of functional units of a third embodiment of a sidelink DTX apparatus according to the present disclosure.

The timer further includes a target receive timer. As shown in FIG. 20, the apparatus 1800 further includes:

a timer turn-off unit 2001, configured to turn off a target receive timer according to the DRX mechanism in a case that it is detected that a target transmit timer and the target receive timer in the timer are both running, where it is agreed in the DRX mechanism that a send priority of the second user terminal 102 is higher than a send priority of the first user terminal 101.

According to the DRX mechanism, in one of the implementations, the send priority of the first user terminal 101 relative to the second user terminal 102 is determined according to a highest priority level of at least one to-be-processed service parameter of the first user terminal 101 and a highest priority level of at least one to-be-processed service parameter of the second user terminal 102 that are pre-configured.

According to the DRX mechanism, in one of the implementations, the send priority of the first user terminal 101 relative to the second user terminal 102 is determined according to a type of the target transmit timer that is run and a type of the target receive timer that is run.

According to the DRX mechanism, in one of the implementations, the send priority of the first user terminal 101 relative to the second user terminal 102 is determined according to a moment at which the target transmit timer is running and a moment at which the running target receive timer is running.

Figure 21:
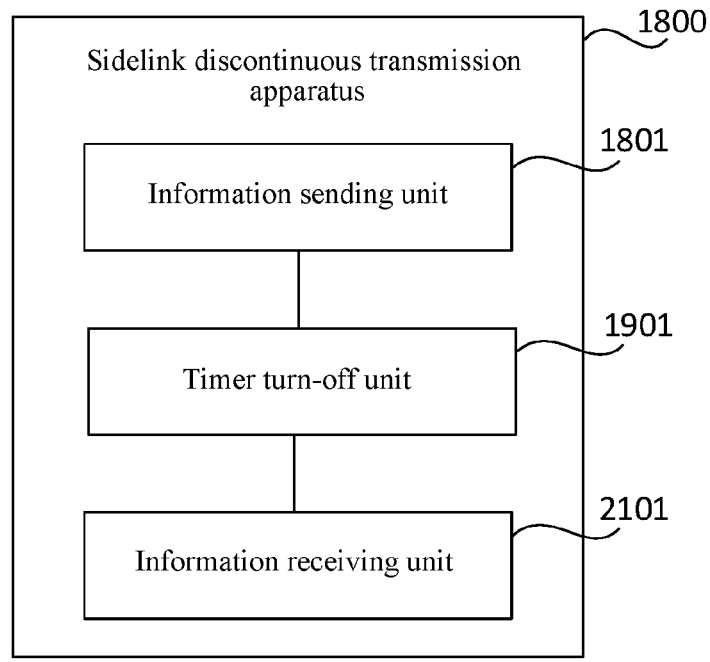
FIG. 21 is a block diagram of functional units of a fourth embodiment of a sidelink DTX apparatus according to the present disclosure.

As shown in FIG. 21, the apparatus 1800 further includes:
an information receiving unit 2101, configured to receive HARQ feedback after a preset interval time in a case that data scheduling/transmission to the first user terminal 101 is performed.

Embodiments of this specification are described above. Other embodiments fall within the scope of the appended claims. In some embodiments, the actions or steps recorded in the claims may be performed in sequences different from those in the embodiments and an expected result may still be achieved. In addition, the processes depicted in the accompanying drawings is not necessarily performed in the specific order or successively to achieve an expected result. In some implementations, multitasking and parallel processing may be feasible or beneficial.

The embodiments of the present disclosure further provide a terminal device, including a processor, a memory, and a computer program stored on the memory and executable on the processor, where the computer program is executed by the processor to implement the steps of any embodiment of the sidelink DRX method or the sidelink DTX method as stated above.

Figure 22:
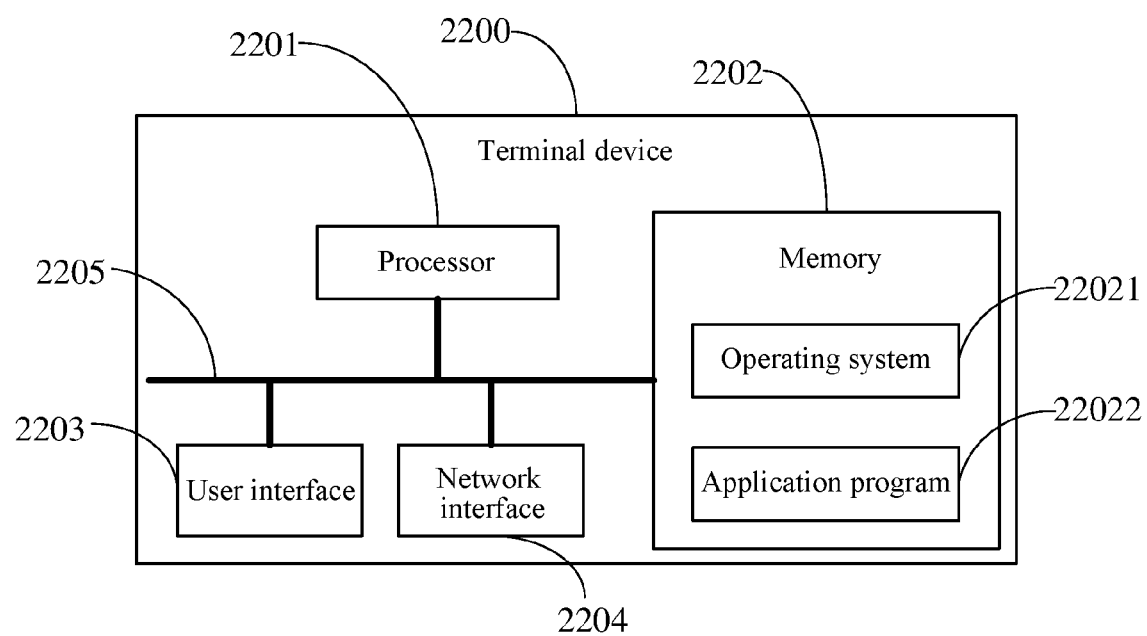
FIG. 22 is a block diagram of circuit connections of an embodiment of a terminal device according to the present disclosure.

FIG. 22 is a block diagram of a terminal device 2200 according to an embodiment of the present disclosure. The terminal device 2200 shown in FIG. 22 includes at least one processor 2201, a memory 2202, at least one network interface 2204, and a user interface 2203. All the components in the terminal device 2200 are coupled together by a bus system 2205. It may be understood that the bus system 2205 is configured to implement connection and communication between the components. In addition to a data bus, the bus system 2205 further includes a power bus, a control bus, and a status signal bus. However, for ease of clear description, all types of buses are marked as the bus system 2205 in FIG. 22.

The user interface 2203 may include a display, a keyboard, or a click/tap device (such as a mouse, a track ball, a touch panel, or a touchscreen).

It can be understood that, the memory 2202 in the embodiments of the present disclosure may be a volatile memory or a non-volatile memory, or may include both a volatile memory and a non-volatile memory. The non-volatile memory may be a read-only memory (ROM), a programmable ROM (PROM), an erasable programmable read-only memory (EPROM), an electrically EPROM (EEPROM), or a flash memory. The volatile memory may be a random access memory (RAM), used as an external cache. Through exemplary but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDRS-DRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DRRAM). The memory 2202 in the system and method described in the embodiments of the present disclosure is intended to include, but is not limited to, the memories and any other memory of a suitable type.

In some implementations, the memory 2202 stores the following elements: an executable module or a data structure, or a subset thereof, or an extension set thereof: an operating system 22021 and an application program 22022.

The operating system 22021 includes various system programs, for example, a framework layer, a core library layer, a driver layer, and the like, which are used for implementing various basic services and processing a task based on hardware. The application program 22022 may include various application programs such as a media player, a browser, and the like, used for implementing various application services. A program for implementing the method in the embodiments of the present disclosure may be included in the application program 22022.

In this embodiment of the present disclosure, the terminal device 2200 further includes: a computer program stored on the memory and executable by the processor, when executed by the processor 2201, the computer program implementing the following step:

monitoring data scheduling/transmission or receiving data scheduling/transmission under control of a timer based on a DRX mechanism during running of a target receive timer in the timer; or allowing performing data scheduling/transmission to a first user terminal, or performing data scheduling/transmission to the first user terminal under control of a timer based on a DRX mechanism during running of a target transmit timer in the timer.

The method disclosed in the embodiments of the present disclosure may be applied to the processor 2201 or implemented by the processor 2201. The processor 2201 may be an integrated circuit chip, having a capability of processing a signal. In an implementation process, steps in the foregoing methods can be implemented by using a hardware integrated logical circuit in the processor 2201, or by using instructions in a form of software. The foregoing processor 2201 may be a general-purpose processor, a digital signal processor (DSP), an application-specific integrated circuit (ASIC), a field-programmable gate array (FPGA) or another programmable logic device, a discrete gate or a transistor logic device, or a discrete hardware component, and may implement or perform the methods, the steps, and logic block diagrams that are disclosed in the embodiments of the present disclosure. The general-purpose processor may be a microprocessor, or the processor may be any conventional processor or the like. The steps of the methods disclosed with reference to the embodiments of the present disclosure may be directly performed and completed by using a hardware decoding processor, or may be performed and completed by using a combination of hardware and software modules in the decoding processor. The software module may be stored in a computer-readable storage medium that is mature in the art, such as a RAM, a flash memory, a ROM, a programmable ROM, an electrically erasable programmable memory, or a register. The computer-readable storage medium is located in the memory 2202, and the processor 2201 reads information in the memory 2202, and completes the steps in the foregoing methods in combination with hardware thereof. Specifically, the computer-readable storage medium stores a computer program. The computer program, when executed by the processor 2201, causes the processor to perform the steps of the foregoing methods.

It may be understood that, the embodiments described in the embodiments of the present disclosure may be implemented by using software, hardware, firmware, middleware, microcode, or a combination thereof. For hardware implementation, the processing unit may be implemented by one or more application-specific integrated circuits (ASIC), digital signal processors (DSP), digital signal processor devices (DSPD), programmable logic devices (PLDs), field programmable gate arrays (FPGA), general-purpose processors, controllers, microcontrollers, microprocessors, other electronic components configured to implement the functions of the present disclosure, or a combination thereof.

For software implementation, the technology described in the embodiments of the present disclosure may be implemented by using modules (for example, processes and functions) implementing the functions of the embodiments of the present disclosure. Software code may be stored in a memory and executed by a processor. The memory may be implemented inside or outside the processor.

Optionally, when executed by the processor 2201, the computer program may further perform the following steps: monitoring data scheduling/transmission or receiving data scheduling/transmission under control of a timer based on a DRX mechanism during running of a target receive timer in the timer; or allowing performing data scheduling/transmission to a first user terminal, or performing data scheduling/transmission to the first user terminal under control of a timer based on a DRX mechanism during running of a target transmit timer in the timer.

The terminal device 2200 can implement the processes and effects implemented by the terminal device in the foregoing embodiments. To avoid repetition, details are not described herein again.

The embodiments of the present disclosure further provide a computer-readable storage medium storing one or more programs. The one or more programs include instructions. The instructions, when executed by a portable electronic device including a plurality of application programs, can cause the portable electronic device to perform the operations of any embodiment of the sidelink DRX method or the sidelink DTX method as stated above. In an embodiment, when executed by a portable electronic device, the instructions can cause the portable electronic device to perform the following operation:

monitoring data scheduling/transmission or receiving data scheduling/transmission under control of a timer based on a DRX mechanism during running of a target receive timer in the timer. In another embodiment, when executed by a portable electronic device, the instructions can cause the portable electronic device to perform following operation: allowing performing data scheduling/transmission to a first user terminal, or performing data scheduling/transmission to the first user terminal under control of a timer based on a DRX mechanism during running of a target transmit timer in the timer.

In short, the foregoing descriptions are merely exemplary embodiments of the present disclosure and are not intended to limit the protection scope of the present disclosure. Any modification, equivalent replacement, or improvement made within the spirit and principle of the present disclosure shall fall within the protection scope of the present disclosure.

The system, the apparatus, the module or the unit described in the foregoing embodiments may be specifically implemented by a computer chip or an entity, or implemented by a product having a certain function. A typical implementation device is a computer. Specifically, the computer may be, for example, a personal computer, a laptop computer, a cellular phone, a camera phone, a smartphone, a personal digital assistant, a media player, a navigation device, an email device, a game console, a tablet computer, a wearable device, or a combination of any of these devices.

Flowcharts and block diagrams in the drawings illustrate architectures, functions, and operations that may be implemented by using the system, the method, and the computer program product according to the various embodiments of the present disclosure. In this regard, each box in a flowchart or a block diagram may represent a unit, a segment, or a part of code. The unit, the segment, or the part of code includes one or more executable instructions used for implementing (one or more) designated logic functions. It should also be noted that, each box in a block diagram and/or a flowchart and a combination of boxes in the block diagram and/or the flowchart may be implemented by using a dedicated hardware-based system configured to perform a specified function or operation, or may be implemented by using a combination of dedicated hardware and computer instructions.

The computer-readable medium includes a non-volatile medium and a volatile medium, a removable medium and a non-removable medium, which may implement storage of information by using any method or technology. The information may be a computer-readable instruction, a data structure, a program module, or other data. Examples of a computer storage medium include but are not limited to a phase-change memory (PRAM), a static random access memory (SRAM), a dynamic random access memory (DRAM), other type of random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette tape, a magnetic tape, a magnetic disk storage or other magnetic storage device, or any other non-transmission medium, which may be configured to store information accessible by a computing device. Based on the definition in this specification, the computer-readable medium may be a non-transient computer-readable medium, and therefore, does not include transitory computer-readable media (transitory media) such as a modulated data signal and a carrier.

It should be further noted that the terms "include", "comprise", or any variants thereof are intended to cover a non-exclusive inclusion. Therefore, a process, method, article, or device that includes a series of elements not only includes such elements, but also includes other elements not specified expressly, or may include inherent elements of the process, method, article, or device. Unless otherwise specified, an element limited by "include a/an . . . " does not exclude other same elements existing in the process, the method, the article, or the device that includes the element.

The embodiments of this specification are all described in a progressive manner, for same or similar parts in the embodiments, refer to these embodiments, and descriptions of each embodiment focus on a difference from other embodiments. Especially, a system embodiment is basically similar to a method embodiment, and therefore is described briefly; for related parts, reference may be made to partial descriptions in the method embodiment.

What is claimed is:

1. A sidelink discontinuous transmission (DTX) method, applicable to a second user terminal, the method comprising:
    allowing performing data scheduling/transmission to a first user terminal during running of an on duration transmit timer; and
    starting, in a case that data scheduling/transmission to the first user terminal is triggered, an inactivity transmit timer to continuously allow performing data scheduling/transmission to the first user terminal,
    wherein after the starting, in a case that data scheduling/transmission to the first user terminal is triggered, the inactivity transmit timer to continuously allow performing data scheduling/transmission to the first user terminal, the method further comprises:

restarting the inactivity transmit timer in a case that data scheduling/transmission to the first user terminal is triggered again during running of the inactivity transmit timer, before allowing performing data scheduling/transmission to the first user terminal during running of the on duration transmit timer; or starting, in a case that data scheduling/transmission to the first user terminal is triggered, the inactivity transmit timer to continuously allow performing data scheduling/transmission to the first user terminal, the method further comprises:

turning off a target receive timer according to a DRX mechanism in a case that it is detected that a target transmit timer and the target receive timer are both running, wherein it is agreed in the DRX mechanism that a send priority of the second user terminal is higher than a send priority of the first user terminal, wherein the target transmit timer is one of the on duration transmit timer, the inactivity transmit timer and the retransmission transmit timer.

2. The method according to claim 1, wherein the second user terminal is further configured with a Hybrid Automatic Repeat reQuest (HARQ) retransmission mechanism, and the method further comprises:

starting a HARQ round-trip latency transmit timer in a case that a HARQ negative acknowledgment (NACK) fed back by the first user terminal is received; and starting, after the HARQ round-trip latency transmit timer expires, a retransmission transmit timer to allow performing retransmission data scheduling/data transmission to the first user terminal.

3. The method according to claim 1, wherein according to the DRX mechanism, the send priority of the first user terminal relative to the second user terminal is determined according to a highest priority level of at least one to-be-processed service parameter of the first user terminal and a highest priority level of at least one to-be-processed service parameter of the second user terminal that are pre-configured; or, wherein according to the DRX mechanism, the send priority of the first user terminal relative to the second user terminal is determined according to a type of the target transmit timer that is run and a type of the target receive timer that is run; or, wherein according to the DRX mechanism, the send priority of the first user terminal relative to the second user terminal is determined according to moments at which the target transmit timer and the target receive timer are running.

4. A terminal device, comprising a processor, a memory, and a computer program stored on the memory and executable on the processor, wherein the computer program is executed by the processor to execute the following operations:

allowing performing data scheduling/transmission to a first user terminal during running of an on duration transmit timer; and starting, in a case that data scheduling/transmission to the first user terminal is triggered, an inactivity transmit timer to continuously allow performing data scheduling/transmission to the first user terminal, wherein after the starting, in a case that data scheduling/transmission to the first user terminal is triggered, the inactivity transmit timer to continuously allow performing data scheduling/transmission to the first user terminal, the processor is configured to: restart the inactivity transmit timer in a case that data scheduling/transmission to the first user terminal is triggered again during running of the inactivity transmit timer, wherein before allowing performing data scheduling/transmission to the first user terminal during running of the on duration transmit timer; or starting, in a case that data scheduling/transmission to the first user terminal is triggered, the inactivity transmit timer to continuously allow performing data scheduling/transmission to the first user terminal, the processor is configured to:

turn off a target receive timer according to a discontinuous reception (DRX) mechanism in a case that it is detected that a target transmit timer and the target receive timer are both running, wherein it is agreed in the DRX mechanism that a send priority of the second user terminal is higher than a send priority of the first user terminal, wherein the target transmit timer is one of the on duration transmit timer, the inactivity transmit timer and the retransmission transmit timer.

5. The terminal device according to claim 4, wherein a second user terminal is further configured with a Hybrid Automatic Repeat reQuest (HARQ) retransmission mechanism, and the method further comprises:

starting a HARQ round-trip latency transmit timer in a case that a HARQ negative acknowledgment (NACK) fed back by the first user terminal is received; and starting, after the HARQ round-trip latency transmit timer expires, a retransmission transmit timer to allow performing retransmission data scheduling/data transmission to the first user terminal.

6. The terminal device according to claim 4, wherein according to the DRX mechanism, the send priority of the first user terminal relative to the second user terminal is determined according to a highest priority level of at least one to-be-processed service parameter of the first user terminal and a highest priority level of at least one to-be-processed service parameter of the second user terminal that are pre-configured; or, wherein according to the DRX mechanism, the send priority of the first user terminal relative to the second user terminal is determined according to a type of the target transmit timer that is run and a type of the target receive timer that is run; or, wherein according to the DRX mechanism, the send priority of the first user terminal relative to the second user terminal is determined according to moments at which the target transmit timer and the target receive timer are running.

7. A terminal device, comprising a processor, a memory, and a computer program stored on the memory and executable on the processor, wherein the computer program is executed by the processor to execute the following operations:

monitoring data scheduling/transmission from a second user terminal during running of an on duration monitoring receive timer;

starting, in a case that the data scheduling/transmission from the second user terminal is received, an inactivity receive timer to continuously monitor the data scheduling/transmission from the second user terminal;

during running of the inactivity receive timer, in a case that the data scheduling/transmission transmitted by the second user terminal is received again, restarting the inactivity receive timer, wherein a target transmit timer is one of the on duration transmit timer, the inactivity transmit timer and a retransmission transmit timer, before monitoring data scheduling/transmission from the second user terminal during running of an on duration monitoring receive timer, the processor is configured to:

turn off the target transmit timer according to a discontinuous reception (DRX) mechanism in a case that it is detected that the target transmit timer and a target receive timer are both running, wherein it is agreed in the DRX mechanism that a send priority of the second user terminal is higher than a send priority of a first user terminal.

8. The terminal device according to claim 7, wherein according to the DRX mechanism, the send priority of the first user terminal relative to the second user terminal is determined according to a highest priority level of at least one to-be-processed service parameter of the first user terminal and a highest priority level of at least one to-be-processed service parameter of the second user terminal that are pre-configured.

9. The terminal device according to claim 7, wherein according to the DRX mechanism, the send priority of the first user terminal relative to the second user terminal is determined according to a type of the target transmit timer that is run on the first user terminal and a type of the target receive timer that is run on the first user terminal.

10. The terminal device according to claim 7, wherein according to the DRX mechanism, the send priority of the first user terminal relative to the second user terminal is determined according to moments at which the target transmit timer and the target receive timer are running on the first user terminal.

11. A non-transitory readable storage medium, wherein the non-transitory readable storage medium stores a program or an instruction, and the program or the instruction, when being executed by a processor, causes the processor to execute steps of the method according to claim 1.

12. A non-transitory readable storage medium, wherein the non-transitory readable storage medium stores a program or an instruction, and the program or the instruction, when being executed by a processor, causes the processor to execute steps of the method according to claim 4.

* * * * *